Dec. 20, 1932.  J. H. KINDELBERGER  1,891,385
GULL WING PLANE
Filed Oct. 10, 1931  3 Sheets-Sheet 1

INVENTOR:
JAMES H. KINDELBERGER.
BY
ATTORNEY.

Dec. 20, 1932.　　J. H. KINDELBERGER　　1,891,385
GULL WING PLANE
Filed Oct. 10, 1931　　3 Sheets-Sheet 2

INVENTOR:
JAMES H. KINDELBERGER,
BY
ATTORNEY.

Dec. 20, 1932.    J. H. KINDELBERGER    1,891,385
GULL WING PLANE
Filed Oct. 10, 1931    3 Sheets-Sheet 3

INVENTOR:
JAMES H. KINDELBERGER,
BY

ATTORNEY.

Patented Dec. 20, 1932

1,891,385

UNITED STATES PATENT OFFICE

JAMES H. KINDELBERGER, OF WEST LOS ANGELES, CALIFORNIA, ASSIGNOR TO DOUGLAS AIRCRAFT COMPANY, INC., OF SANTA MONICA, CALIFORNIA, A CORPORATION OF DELAWARE

GULL WING PLANE

Application filed October 10, 1931. Serial No. 568,091.

My invention relates to airplanes, and particularly to an airplane in which the pilot will have maximum vision in a forward direction, in a forwardly upwardly inclined direction, and a forwardly declined direction.

In the airplane of my invention the wing structure or wings are so formed or positioned that the pilot may have maximum vision in forward and forwardly oblique directions. The wing structure is so formed that the pilot may look forwardly above one portion or portions and forwardly below another portion or portions of the wing structure.

In the preferred form of my invention, which, however, is not the only form in which my invention may be embodied, there is a channel, and preferably a conical channel, provided in the wing structure directly in front of the pilot's cockpit, which channel is formed by suitably shaping the wing structure where it passes over the fuselage. The pilot may view the forward area through this channel. For maximum forward vision the channel may be conical, as previously mentioned, spreading or enlarging away from the pilot's cockpit. This permits a relatively large angle of vision for the pilot.

In order that the forwardly declined area will not be obscured, I prefer to have the portions of the wing structure on each side of the fuselage and the central upper channel positioned at or above the horizontal plane of the pilot's eyes, so that he may readily see below the wing structure and see forwardly and downwardly.

In conjunction with the features above referred to, I may provide side channels which in the preferred form of my invention take the shape of conical channels in the lower sides of the wing structure on opposite sides of the fuselage where the wing structure connects to the fuselage. Such a construction will give the pilot maximum vision and will enable him to look forwardly and downwardly in a direction quite close to the fuselage of the airplane.

In the form of my invention which utilizes a fuselage and a wing structure which are designed to provide a central channel above the fuselage and side channels on each side of the fuselage directly below the wing structure, it is not essential that the channels be of conical shape even though such a shape gives the most satisfactory results. The essential feature of this portion of my invention resides in the provision of these three channels, all of which converge in a rearward direction and converge toward the pilot's seat in order that the pilot, who is positioned to the rear of the trailing edge of the wing structure, may cast his vision either forwardly through the central channel or through the side channels.

It is an object of my invention to provide an airplane of the character defined in the foregoing paragraph in which the wing structure is positioned in a plane above the fuselage and includes connecting portions which extend downwardly and are joined to the upper portion of the fuselage. The connecting portions of the wing structure slope rearwardly and inwardly in such a manner as to define the three converging channels.

A further object of my invention is to form the connecting portions of the wing structure of tapered cross section so that they will be narrower at the rearward or trailing edges than they are at the forward or leading edges. This enables the channels to be very readily converged in a rearward direction and enables fuller vision of the pilot to be obtained.

Where it is desirable or necessary to have the greatest possible forward and forwardly oblique vision, I provide certain portions of the wing structure and the fuselage with transparent areas, through which the pilot will have access to the various channels or conical channels provided by my invention.

The important features of my invention are adapted to separate or conjoint use, and although these features when embodied in a single structure all cooperate to provide an airplane superior to an airplane including less than the whole of my invention, I do not wish to be limited to an airplane including each and every feature of my invention, but wish the scope of my invention to be construed in accordance with the appended claims.

I will now describe the details of construction of the preferred form of my invention, and in order to do this I will refer to the accompanying drawings in which:

Fig. 2 is an elevational view of a portion of the fuselage of the airplane showing the pilot sitting in the cockpit.

Fig. 3 is a front elevational view of the fuselage and shows clearly the portion of the plane which includes certain essential characteristics of my invention.

Fig. 4 is a sectional view taken through the airplane, looking forwardly from the cockpit thereof.

I will now refer to the drawings in detail and describe the structural features of my invention and the manner in which they operate and contribute new functions and new and useful results to the art.

Figure 1:
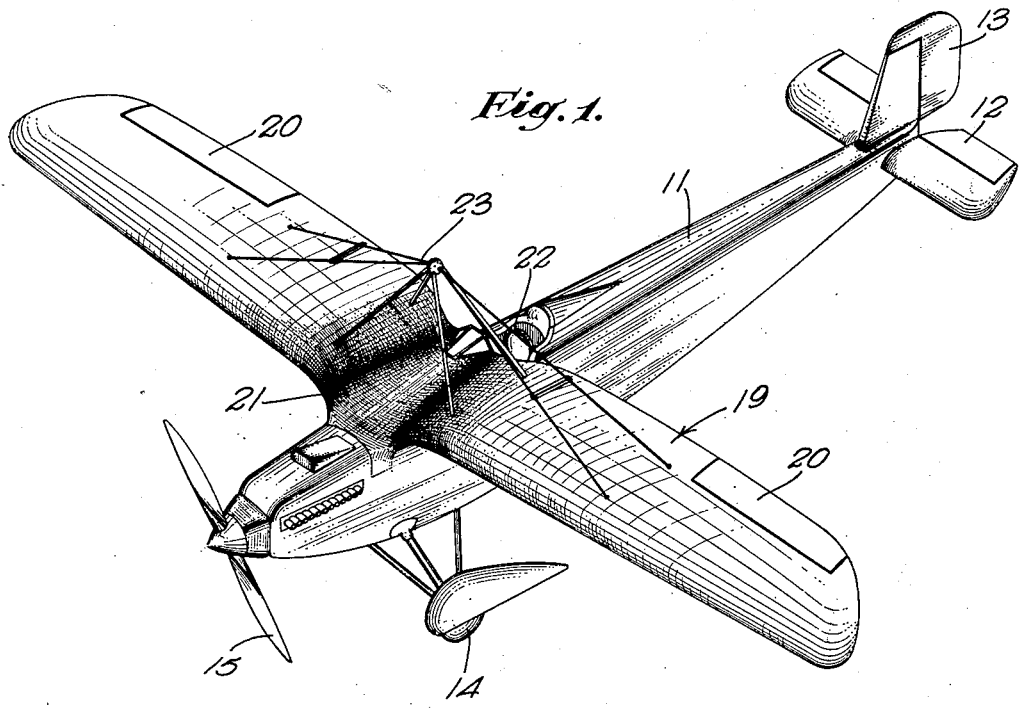
Fig. 1 is a perspective view of an airplane embodying the features of my invention.

In Fig. 1 of the drawings, the numeral 11 represents the fuselage which is provided with elevators 12, a rudder 13, landing gears 14, a propeller 15, and other structural elements which are necessary in the fuselage construction. The numeral 19 represents a wing structure which for the purpose of description will be divided into outer portions 20 and a central portion 21. The wing structure 19 is connected to the fuselage at its central portion 21 directly in front of a pilot's cockpit 22. If desired, suitable reinforcing such as indicated by the numeral 23 may be provided.

Figure 5:
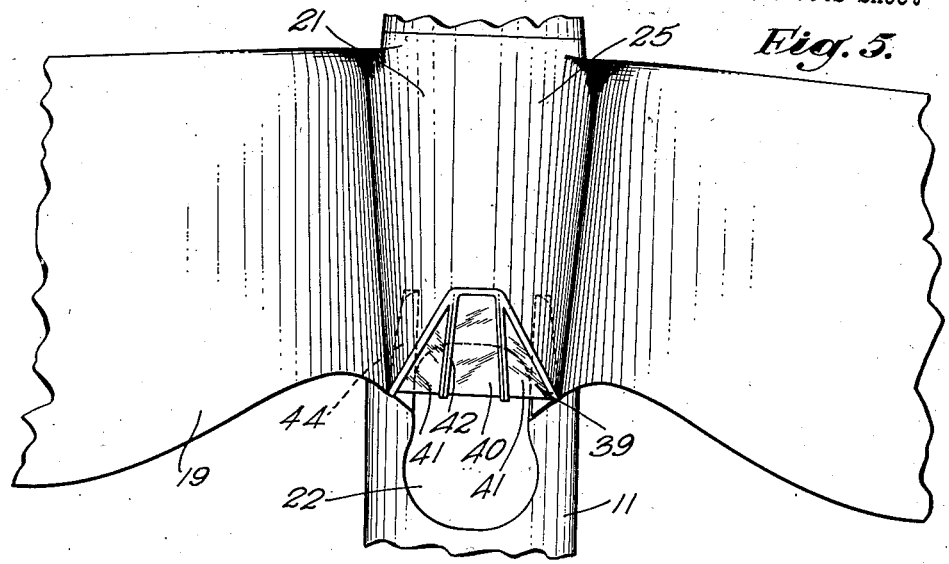
Fig. 5 is a plan view of the portion of the plane where the wing structure is connected to the fuselage.
Figure 6:
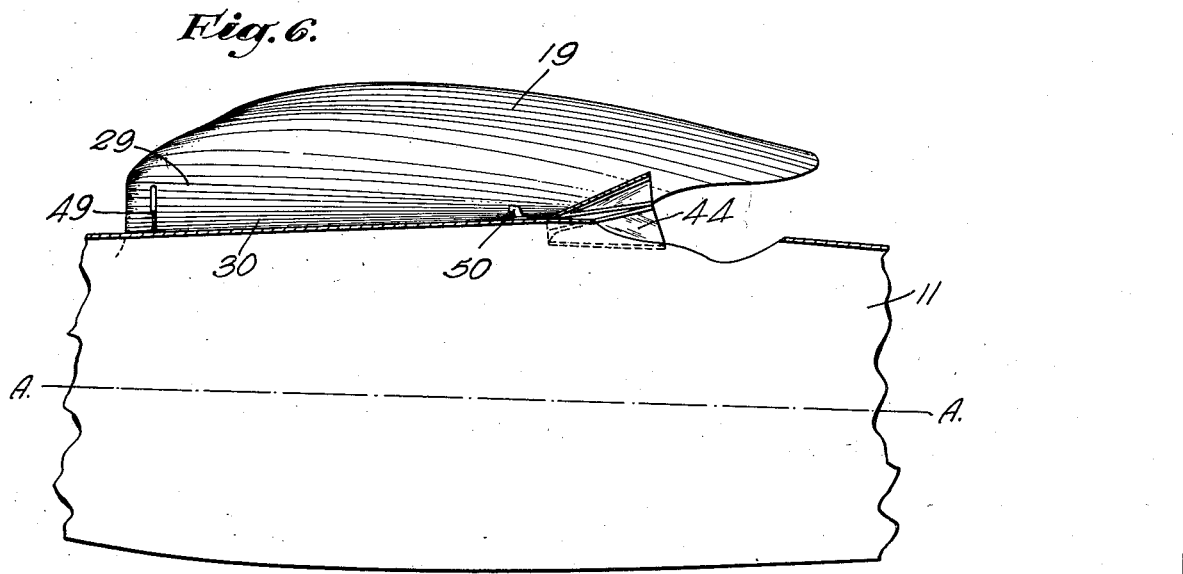
Fig. 6 is a longitudinal sectional view taken through that portion of the fuselage where the wing structure connects thereto.

I will now proceed to describe the essential characteristics of my invention. As will be seen from the drawings, and particularly from Figs. 3 and 4, the outer portions 20 of the wing structure 19 are positioned above the fuselage 11, and although it is not absolutely essential, it is preferable that the lower surface 24 of the outer portions 20 be situated in a horizontal plane which is above the fuselage 11. The central portion 21 of the wing structure is so formed that it provides an upper central channel 25 which forms a continuation of the upper surface 26 of the outer portions 20. It will be noted that this upper surface 26 extends inwardly, and when the fuselage is approached, this surface commences to curve downwardly, as indicated at 27, and then curves downwardy on a relatively small radius directly above the outer limits of the fuselage, as indicated at 29. This relatively sharp curve blends or molds itself into a curved surface 30, which is curved in a reverse direction and which is preferably generated around an axis which is directly above the longitudinal axis of the fuselage, in order that the curved surface 30 may blend into the oppositely curved surfaces 29 which are arranged on each side thereof, as previously pointed out. The curved surface 30 is, in the preferred form of my invention, the surface of a cone which has its base toward the forward end of the airplane. Therefore, this surface 30 is a conical surface and enlarges as the forward end of the airplane is approached. In order that the curved surfaces 29 may properly blend into this curved surface 30 it will be necessary for the curved surfaces 29 to diverge outwardly or be conical, as shown clearly in Figs. 3, 4, and 5. The surface 30, as illustrated in Fig. 6, is approximately on the same level as the upper wall of the fuselage and inclines downwardly and forwardly relative to the major axis A—A of the fuselage 11.

The lower surface 24 of each outer portion 20 is curved forwardly and downwardly as it approaches the fuselage 11 in order to provide a curved surface 35 where the wing structure meets and connects to the fuselage. This curved surface 35 is preferably a part surface of a cone, and the curved surface diverges outwardly as the forward part of the plane is approached. This is clearly shown in Fig. 4, wherein the curved edge 36 represents the rearward end of the conical surface 30 at the point where the wing connects to the fuselage 11, and the edge 37 represents the forward edge of the wing structure where it connects to the fuselage 11. It will be seen that the edges 36 are much closer together than the edges 37, and it will therefore be seen that the curved surfaces 35 are conical and spread outwardly toward the forward end of the airplane.

Provided directly in front of the cockpit 22 is a windshield 39 which extends into the central upper channel 25. The windshield 39 has a central transparent member 40 and side transparent members 41 which are supported in a suitable frame structure 42. The central transparent member 40 declines forwardly but lies in a substantially horizontal plane. The side transparent members 41 decline forwardly but are not located in a horizontal plane and slant downwardly and outwardly, as shown best in Figs. 1, 3 and 4, in order that they will form a portion of a polygon and form a complete closure in the rearward part of the upper channel 25 and directly in front of the pilot's seat. In the lower portions of the wings and in the adjacent portions of the fuselage at the rearward parts of the wings there are provided lower windows 44, which are provided by transparent members 45 supported in a suitable frame 46. There is a window 44 on each side of the plane, and these windows 44 extend forwardly in a direction almost parallel to the major axis A—A of the fuselage. The windows do not rest in a vertical plane, but slant upwardly and outwardly, as shown best in Fig. 4. It will be seen that these windows are placed at the rearward part of the lower channels 35 and extend forwardly below the wing structure 19, as shown best in Fig. 2. The windows 44 provide visual access to the channels 35.

Placed in the upper central channel 25 is a front gun-sight 49 and a rear gun-sight 50. These gun-sights are provided when the plane is intended for combat use, and the plane may also be provided with suitable machine guns in the wing structure.

Figure 7:
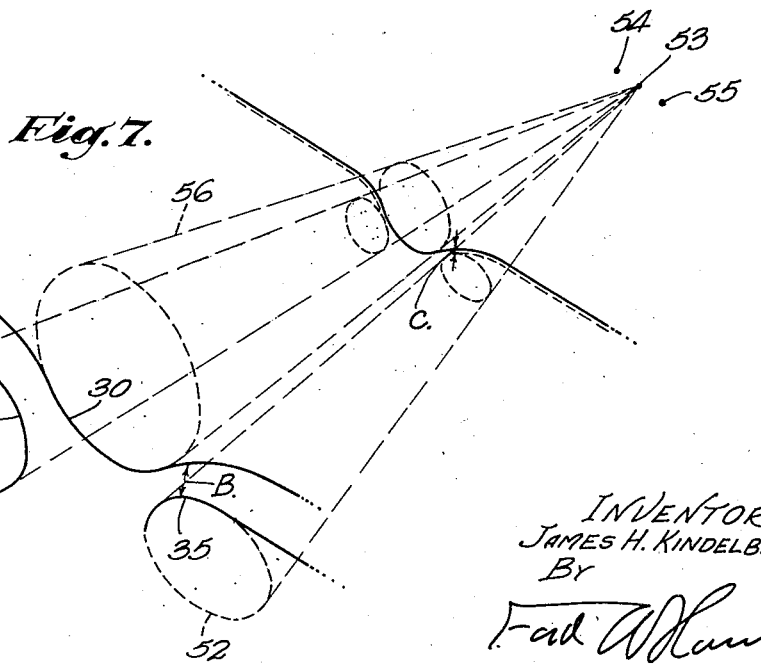
Fig. 7 is a diagrammatic view illustrating the conical channels which are provided by my invention.

In Fig. 7 I have diagrammatically illustrated the conical channels which constitute an important part of my invention and which are designed to give the pilot the maximum vision. As previously pointed out, the surface 30 is a conical surface, and for illustrative purposes in Fig. 7 I show by dotted lines a cone 56 of which the conical surface 30 is a part. The surfaces 35 are likewise conical surfaces and I therefore show cones 51 and 52, of which the surfaces 35 form a part. In the preferred form of my invention the cones 56, 51, and 52 each has an apex which coincides at 53, which is a point adjacent the pilot's eyes. The purpose of such an arrangement is to enable the pilot to look through any of the cones without moving his head. I have found that very good results may be obtained when the apexes of the three cones are not arranged on exactly the same point as at 53, but are arranged, for example, with the apex of the cone 56 on the point 53, the apex of the cone 51 on the point 54, and the apex of the cone 52 on the point 55. When such a construction is used, the pilot can clearly see forwardly through the central channel 25 and can see fairly well through the side channels provided by the surfaces 35. If a better vision is desired through either of the side channels defined by the surfaces 35, the pilot may move his head slightly to one side or the other and thus get maximum vision through either of these side channels. In certain types of cones it is desirable for structural reasons to arrange the apexes on three separate points, because of the fact that when the apexes are arranged on a single point 53 the wing structure at its rearward portion must be made relatively narrow. For example, referring to Fig. 7, it will be seen that the wing structure at the forward edge thereof, as indicated at B, is fairly heavy, but that the wing structure at the rearward part thereof, as indicated at C, is very narrow. My invention is not limited to conical surfaces defining the channels, nor to conical surfaces each having an apex which is placed on a single point as at 53.

Let us now refer to Fig. 2, in which the pilot is indicated by the numeral 57. The pilot's eyes are indicated at 58. When the pilot desires to look forwardly through the upper central channel 25, his line of vision will be as indicated by the line 59. When the pilot desires to look through the channel 35 on the inner side of the fuselage 11, his line of vision will be as indicated by the line 60. It will be noted that the pilot looks forwardly through the forward part of the cockpit 22 and through the window 44 in order to gain access to the channel 35. If the pilot desires to look in a downward direction, his vision will be on a line indicated by the line 61, and if he wishes to look forwardly in an upward direction, his vision will be on a line 62. The dead area, that is, the area which is obscured by the wing structure, is relatively small and, assuming that the pilot does not move his head when looking in various directions, the dead area will be substantially as indicated by the angle D. It will be understood, however, that there is no dead area directly in front of the pilot, but that the dead area is at the sides where the wing portions 20 are in a plane above the pilot's eyes. It should be strictly understood, however, that the pilot may raise or lower his head, as desired, in order to see those areas which might be obscured by the wing structure if he didn't so move his head. The wing structure is particularly designed to give the pilot a maximum forward vision, a maximum forwardly upwardly inclined vision, and a maximum forwardly declined vision. It will be noted that the lower wall forming the channel 25 inclines downwardly and forwardly, as shown clearly in Fig. 6, and therefore the pilot may see directly in front of the airplane. In other words, his vision in the forward direction is forward and downward, as indicated by the line 59 in Fig. 2.

The downwardly extending curved portions of the wing structure may be conveniently referred to as connecting portions since they are the parts by means of which the wing structure is secured to the fuselage. The connecting portions, as will be observed from the drawings, slant upwardly and inwardly at the point of juncture with the fuselage and are of tapered cross section, being thinner at the trailing edges than at the leading edges. These particular features of construction are highly important to the provision of the three channels, all of which converge toward the pilot's seat.

As previously pointed out, my invention is not limited to the construction disclosed herein, but may be included in various embodiments which do not use all of the details of construction or features of my invention. It is my intention in this application to cover not only the invention in its entirety, but to cover all those elements which are susceptible of independent use. It is further my intention to cover all equivalents of my invention by means of the appended claims, which are to be broadly construed.

I claim as my invention:

1. In an airplane: a fuselage having a pilot's seat wherein a pilot may look forward over said fuselage; and a wing structure connected thereto, having a plurality of channels through which the pilot may see, all of said channels being conical and having apexes near the point where the pilot's eyes are located.

2. In an airplane: a fuselage having a pilot's seat wherein a pilot may look forward over said fuselage; a wing structure connected thereto, having a plurality of channels through which the pilot may see, all of said channels being conical and having apexes near the point where the pilot's eyes are located; and window means in said wing structure giving visual access to certain of said channels.

3. In an airplane: a fuselage having a pilot's seat wherein a pilot may look forward over said fuselage; a wing structure connected thereto, having a plurality of channels through which the pilot may see, all of said channels being conical and having apexes near the point where the pilot's eyes are located; and window means in said fuselage giving visual access to certain of said channels.

In testimony whereof, I have hereunto set my hand at Santa Monica, California, this 3rd day of October, 1931.

JAMES H. KINDELBERGER.